United States Patent
Liu et al.

(10) Patent No.: US 12,156,043 B2
(45) Date of Patent: Nov. 26, 2024

(54) METHODS AND APPARATUSES FOR RET CONTROL

(71) Applicant: Telefonaktiebolaget LM Ericsson (publ), Stockholm (SE)

(72) Inventors: Chunhui Liu, Beijing (CN); Yuanchun Xie, Beijing (CN); Tao Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 17/783,357

(22) PCT Filed: Dec. 12, 2019

(86) PCT No.: PCT/CN2019/124912
§ 371 (c)(1),
(2) Date: Jun. 8, 2022

(87) PCT Pub. No.: WO2021/114185
PCT Pub. Date: Jun. 17, 2021

(65) Prior Publication Data
US 2023/0008813 A1    Jan. 12, 2023

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 72/54* (2023.01); *H04B 17/21* (2015.01); *H04B 17/252* (2023.05)

(58) Field of Classification Search
CPC ..... H04W 16/00; H04W 16/24; H04W 16/28; H04W 72/02; H04W 72/08;
(Continued)

(56) References Cited

U.S. PATENT DOCUMENTS

| 7,529,215 B2 | 5/2009 | Osterling |
| 8,217,848 B2 | 7/2012 | Girard et al. |

(Continued)

FOREIGN PATENT DOCUMENTS

| CN | 106576254 A | 4/2017 |
| CN | 109314558 A | 2/2019 |

(Continued)

OTHER PUBLICATIONS

Author Unknown, "Technical Specification Group Radio Access Network; NR; Physical layer procedures for data (Release 15)," Technical Specification 38.214, Version 15.1.0, Mar. 2018, 3GPP Organizational Partners, 77 pages.

(Continued)

*Primary Examiner* — Warner Wong
(74) *Attorney, Agent, or Firm* — Withrow & Terranova, PLLC

(57) ABSTRACT

Methods and apparatuses for remote electrical tilt (RET) control are disclosed. According to an embodiment, a network entity obtains beam reports indicating beam candidates suitable for serving terminal devices in a serving area of an access network node. The network entity determines a spatial distribution of the beam candidates based on the beam reports. The network entity determines one or more boundaries dividing the beam candidates into a plurality of groups, based on the spatial distribution. The network entity determines control information related to RET for an antenna array of the access network node, based on the one or more boundaries.

20 Claims, 17 Drawing Sheets

(51) Int. Cl.
*H04W 72/54* (2023.01)
*H04B 17/20* (2015.01)
*H04B 17/21* (2015.01)

(58) Field of Classification Search
CPC . H04W 72/046; H04W 72/085; H04W 24/10; H04W 36/0058; H04W 36/00692; H04B 7/0686; H04B 7/0695; H04B 7/06952; H04B 10/0775; H04B 10/0795; H04B 17/00; H04B 17/02; H04B 17/04; H04B 17/0452; H04B 17/11; H04B 17/21–22; H04B 17/252; H04L 49/505
See application file for complete search history.

(56) References Cited

U.S. PATENT DOCUMENTS

| | | | | |
|---|---|---|---|---|
| 9,030,363 | B2* | 5/2015 | Kenington | H01Q 25/00 343/757 |
| 9,699,672 | B2 | 7/2017 | Shen et al. | |
| 11,343,681 | B1* | 5/2022 | Kim | H04W 16/28 |
| 2005/0085267 | A1* | 4/2005 | Lemson | H04B 7/10 455/562.1 |
| 2007/0161348 | A1* | 7/2007 | Gribben | H04W 88/08 455/13.3 |
| 2009/0141623 | A1* | 6/2009 | Jung | H01Q 21/205 455/562.1 |
| 2011/0053647 | A1* | 3/2011 | Oyama | H04W 16/28 455/562.1 |
| 2011/0159810 | A1* | 6/2011 | Kenington | H01Q 21/24 455/25 |
| 2012/0194385 | A1* | 8/2012 | Schmidt | H01Q 25/00 342/368 |
| 2013/0229308 | A1* | 9/2013 | Pu | H01Q 3/40 342/373 |
| 2013/0231152 | A1 | 9/2013 | Zimmerman | |
| 2013/0331140 | A1* | 12/2013 | Halbauer | H04W 72/51 455/509 |
| 2015/0011198 | A1* | 1/2015 | Wellington | H04W 24/02 455/418 |
| 2015/0357708 | A1* | 12/2015 | Au | H01Q 1/246 343/766 |
| 2016/0021650 | A1 | 1/2016 | Chembil-Palat et al. | |
| 2016/0056982 | A1* | 2/2016 | Wang | H01Q 21/24 375/219 |
| 2016/0380352 | A1* | 12/2016 | Liu | H01Q 3/08 342/359 |
| 2017/0040682 | A1* | 2/2017 | Lee | H04B 17/17 |
| 2017/0181188 | A1 | 6/2017 | Brisebois et al. | |
| 2018/0152852 | A1 | 5/2018 | Chang | |
| 2018/0287255 | A1* | 10/2018 | Zimmerman | H01Q 3/08 |
| 2019/0081687 | A1 | 3/2019 | Sadiq et al. | |
| 2020/0044321 | A1* | 2/2020 | Ai | H01Q 3/32 |
| 2020/0245412 | A1* | 7/2020 | Kumar | H04B 7/0617 |
| 2020/0266879 | A1* | 8/2020 | Chia | H04B 7/0828 |
| 2020/0350675 | A1* | 11/2020 | Brobston | H01Q 21/08 |
| 2020/0388915 | A1* | 12/2020 | Xu | F16H 63/16 |
| 2021/0203422 | A1* | 7/2021 | Gale | H01Q 3/267 |
| 2021/0258053 | A1* | 8/2021 | Göransson | H04W 16/28 |
| 2022/0191711 | A1* | 6/2022 | Parihar | H04B 7/0689 |
| 2022/0224007 | A1* | 7/2022 | Duan | F16H 25/08 |
| 2022/0255223 | A1* | 8/2022 | Tran | H04W 4/40 |
| 2023/0307831 | A1* | 9/2023 | Li | H01Q 3/32 |

FOREIGN PATENT DOCUMENTS

| | | | |
|---|---|---|---|
| IN | 201947017121 A | 10/2019 | |
| WO | 2012079202 A1 | 6/2012 | |
| WO | WO-2015187130 A1 * | 12/2015 | H04B 7/024 |

OTHER PUBLICATIONS

Author Unknown, "Base Standard AISG v3.0," Version 3.0.2.1, Jun. 11, 2019, Antenna Interface Standards Group, 202 pages.

Bishop, Christopher, "Pattern Recognition and Machine Learning," 2006, Springer, 758 pages.

Gao, et al., "Utilization of Channel Reciprocity in Advanced MIMO System," Chinacom, Aug. 25-27, 2010, Beijing, China, ICST, 5 pages.

Neiman, "The Principle of Reciprocity in Antenna Theory," Proceedings of the I.R.E., Dec. 1943, pp. 666-671.

Pedrini, Leo, "What is Antenna Electrical and Mechanical Tilt (and How to use it)?," telecomhall.net/t/what-is-antenna-electrical-and-mechanical-tilt-and-how-to-use-it/6388, Oct. 13, 2011, telecomHall, 14 pages.

International Search Report and Written Opinion for International Patent Application No. PCT/CN2019/124912, mailed Aug. 31, 2020, 6 pages.

Extended European Search Report for European Patent Application No. 19956056.6, mailed Jul. 28, 2023, 11 pages.

* cited by examiner

METHODS AND APPARATUSES FOR RET CONTROL

This application is a 35 U.S.C. § 371 national phase filing of International Application No. PCT/CN2019/124912, filed Dec. 12, 2019, the disclosure of which is incorporated herein by reference in its entirety.

TECHNICAL FIELD

Embodiments of the disclosure generally relate to communication, and, more particularly, to methods and apparatuses for remote electrical tilt (RET) control.

BACKGROUND

This section introduces aspects that may facilitate better understanding of the present disclosure. Accordingly, the statements of this section are to be read in this light and are not to be understood as admissions about what is in the prior art or what is not in the prior art.

The efficiency of a cellular network depends on its correct configuration and adjustment of radiant systems which are transmitting and receiving antennas. One of the most important optimizations is based on correct adjusting tilt, or the inclination of the antenna in relation to an axis. As shown in FIG. 1, with the tilt, irradiation can be directed further down or higher, concentrating the energy in the new desired direction. The tilt may be used when it is required to reduce interference and/or coverage in some specific areas, allowing each cell to meet only its designed area.

The antenna irradiation diagram is a graphical representation of how the signal is spread through that antenna, in all directions. FIG. 2 shows the antenna irradiation diagram when it is observed "from above" as well as "aside".

The tilt represents the inclination or angle of the antenna to its axis. It can be adjusted to adapt to different scenarios and demands. This adjustment can be either manual or remote. In the latter case, it is known as remote electrical tilt (RET). Usually, a small engine connected to the screw stem/regulator does the job of adjusting the tilt. A beam downtilt angle of the antenna may be adjusted at a remote control center by using a network, which can greatly reduce costs of adjusting and maintaining an antenna downtilt angle and improve work efficiency. Most of the RET systems use antenna interface standard group (AISG) protocol which is an open specification for the control interface for these systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for RET control.

According to a first aspect of the disclosure, there is provided a method performed by a network entity. The method may comprise obtaining beam reports indicating beam candidates suitable for serving terminal devices in a serving area of an access network node. The method may further comprise determining a spatial distribution of the beam candidates based on the beam reports. The method may further comprise determining one or more boundaries dividing the beam candidates into a plurality of groups, based on the spatial distribution. The method may further comprise determining control information related to remote electrical tilt (RET) for an antenna array of the access network node, based on the one or more boundaries.

In this way, RET control can be effectively directed with the beam reports.

In an embodiment of the disclosure, the beam reports may further indicate channel conditions over the beam candidate. The one or more boundaries may be determined based further on the channel conditions.

In an embodiment of the disclosure, the beam reports may further indicate channel conditions over the beam candidates. The control information related to RET may be determined based further on the channel conditions.

In an embodiment of the disclosure, the control information related to RET may be determined under a precondition that random access is ensured for the terminal devices in the serving area of the access network node.

In an embodiment of the disclosure, determining the spatial distribution of the beam candidates may comprise mapping the beam candidates to corresponding beam widths based on directions of the beam candidates. Determining the spatial distribution of the beam candidates may further comprise scattering one or more beam candidates having the same beam direction within the corresponding beam width.

In an embodiment of the disclosure, the one or more beam candidates having the same beam direction may be scattered within the corresponding beam width in a random, or uniform, or Gaussian manner.

In an embodiment of the disclosure, the one or more boundaries may be determined by using a machine learning process.

In an embodiment of the disclosure, the machine learning process may be a supervised learning process or an unsupervised learning process.

In an embodiment of the disclosure, the supervised learning process may be performed by using at least one of: linear classification; unlinear classification; and neural networks.

In an embodiment of the disclosure, the unsupervised learning process may comprise a clustering process.

In an embodiment of the disclosure, determining the control information related to RET may comprise determining a distribution center of the spatial distribution based on the one or more boundaries. Determining the control information related to RET may further comprise determining an adjustment of the tilt angle of the antenna array such that a coverage of the antenna array is moved towards the distribution center.

In an embodiment of the disclosure, determining the control information related to RET may comprise determining a distribution center of the spatial distribution based on the one or more boundaries. Determining the control information related to RET may further comprise, when the channel conditions of terminal devices located in a direction away from the distribution center are above a predetermined threshold, determining an adjustment of the tilt angle of the antenna array such that a coverage of the antenna array is moved towards the distribution center.

In an embodiment of the disclosure, the network entity may be the access network node. The control information related to RET may be used by the access network node to control the antenna array.

In an embodiment of the disclosure, the network entity may be a server. The control information related to RET may be sent to the access network node to control the antenna array.

According to a second aspect of the disclosure, there is provided a method performed by an access network node. The method may comprise receiving, from terminal devices in a serving area of the access network node, beam reports indicating beam candidates suitable for serving the terminal devices. The method may further comprise sending the beam reports to a server. The method may further comprise receiving, from the server, control information related to RET for an antenna array of the access network node. The method may further comprise controlling the antenna array based on the control information.

In this way, RET control can be effectively directed with the beam reports.

According to a third aspect of the disclosure, there is provided a network entity. The network entity may comprise at least one processor and at least one memory. The at least one memory may contain instructions executable by the at least one processor, whereby the network entity may be operative to obtain beam reports indicating beam candidates suitable for serving terminal devices in a serving area of an access network node. The network entity may be further operative to determine a spatial distribution of the beam candidates based on the beam reports. The network entity may be further operative to determine one or more boundaries dividing the beam candidates into a plurality of groups, based on the spatial distribution. The network entity may be further operative to determine control information related to RET for an antenna array of the access network node, based on the one or more boundaries.

In an embodiment of the disclosure, the beam reports may further indicate channel conditions over the beam candidates. The instructions may be executable by the at least one processor, whereby the network entity may be operative to determine the one or more boundaries based further on the channel conditions.

In an embodiment of the disclosure, the beam reports may further indicate channel conditions over the beam candidates. The instructions may be executable by the at least one processor, whereby the network entity may be operative to determine the control information related to RET based further on the channel conditions.

In an embodiment of the disclosure, the instructions may be executable by the at least one processor, whereby the network entity may be operative to determine the control information related to RET under a precondition that random access is ensured for the terminal devices in the serving area of the access network node.

In an embodiment of the disclosure, the instructions may be executable by the at least one processor, whereby the network entity may be operative to determine the spatial distribution of the beam candidates by mapping the beam candidates to corresponding beam widths based on directions of the beam candidates. The network entity may be operative to determine the spatial distribution of the beam candidates by scattering one or more beam candidates having the same beam direction within the corresponding beam width.

In an embodiment of the disclosure, the one or more beam candidates having the same beam direction may be scattered within the corresponding beam width in a random, or uniform, or Gaussian manner.

In an embodiment of the disclosure, the instructions may be executable by the at least one processor, whereby the network entity may be operative to determine the one or more boundaries by using a machine learning process.

In an embodiment of the disclosure, the machine learning process may be a supervised learning process or an unsupervised learning process.

In an embodiment of the disclosure, the supervised learning process may be performed by using at least one of: linear classification; unlinear classification; and neural networks.

In an embodiment of the disclosure, the unsupervised learning process may comprise a clustering process.

In an embodiment of the disclosure, the instructions may be executable by the at least one processor, whereby the network entity may be operative to determine the control information related to RET by determining a distribution center of the spatial distribution based on the one or more boundaries. The network entity may be operative to determine the control information related to RET by determining an adjustment of the tilt angle of the antenna array such that a coverage of the antenna array is moved towards the distribution center.

In an embodiment of the disclosure, the instructions may be executable by the at least one processor, whereby the network entity may be operative to determine the control information related to RET by determining a distribution center of the spatial distribution based on the one or more boundaries. The network entity may be operative to determine the control information related to RET by, when the channel conditions of terminal devices located in a direction away from the distribution center are above a predetermined threshold, determining an adjustment of the tilt angle of the antenna array such that a coverage of the antenna array is moved towards the distribution center.

In an embodiment of the disclosure, the network entity may be the access network node. The control information related to RET may be used by the access network node to control the antenna array.

In an embodiment of the disclosure, the network entity may be a server. The control information related to RET may be sent to the access network node to control the antenna array.

According to a fourth aspect of the disclosure, there is provided an access network node. The access network node may comprise at least one processor and at least one memory. The at least one memory may contain instructions executable by the at least one processor, whereby the access network node may be operative to receive, from terminal devices in a serving area of the access network node, beam reports indicating beam candidates suitable for serving the terminal devices. The access network node may be further operative to send the beam reports to a server. The access network node may be further operative to receive, from the server, control information related to RET for an antenna array of the access network node. The access network node may be further operative to control the antenna array based on the control information.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a network entity. The network entity may comprise an obtaining module for obtaining beam reports indicating beam candidates suitable for serving terminal devices in a serving area of an access network node. The network entity may further comprise a first determination module for determining a spatial distribution of the beam candidates based on the beam reports. The network entity may further comprise a second determination module for determining one or more boundaries dividing the beam candidates into a plurality of groups, based on the spatial distribution. The network entity may further comprise a third determination module for determining control information related to RET for an antenna array of the access network node, based on the one or more boundaries.

According to an eighth aspect of the disclosure, there is provided an access network node. The access network node may comprise a first reception module for receiving, from terminal devices in a serving area of the access network node, beam reports indicating beam candidates suitable for serving the terminal devices. The access network node may further comprise a sending module for sending the beam reports to a server. The access network node may further comprise a second reception module for receiving, from the server, control information related to RET for an antenna array of the access network node. The access network node may further comprise a controlling module for controlling the antenna array based on the control information.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

By adjusting the downtilt of an antenna, the cell coverage and the inter-cell interference can be balanced to ensure a good performance of wireless networks. To further improve network efficiency, beamforming attracts much attention. It is a signal processing technique for directional reception or transmission. This is achieved by combining antenna elements in a phased array in such a way that the signal at a particular angle experiences constructive interference while others experience destructive interference. It benefits transmitters/receivers to have signal to/from the desired users together with nulling out the directions to/from the interference users. In other words, while performing beamforming, base stations can measure angles of UE locations.

Furthermore, next-generation cellular networks must provide a set of mechanisms by which user equipments (UEs) and next generation node base stations (gNBs) establish highly directional transmission links, typically using high-dimensional phased arrays, to benefit from the resulting beamforming gain and sustain an acceptable communication quality. Directional links, however, require fine alignment of the transmitter and receiver beams, achieved through a set of operations known as beam management. They are fundamental to perform a variety of control tasks including initial access for idle users, which allows a mobile UE to establish a physical link connection with a gNB, and beam tracking for connected users, which enables beam adaptation schemes, or handover, path selection and radio link failure recovery procedures.

Figure 1:
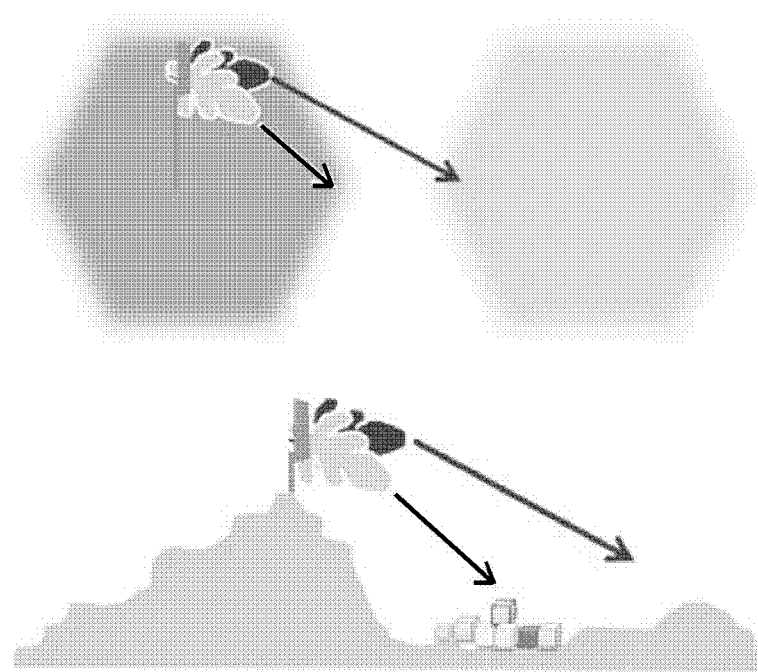
FIG. 1 is a diagram illustrating the tilt of an antenna.
Figure 2:
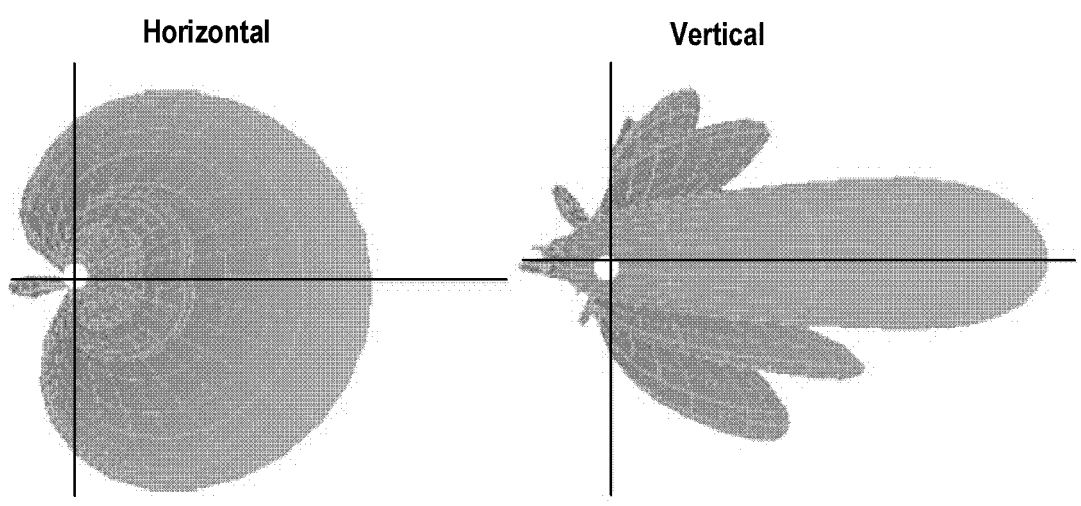
FIG. 2 is a diagram illustrating an antenna irradiation diagram.
Figure 3:
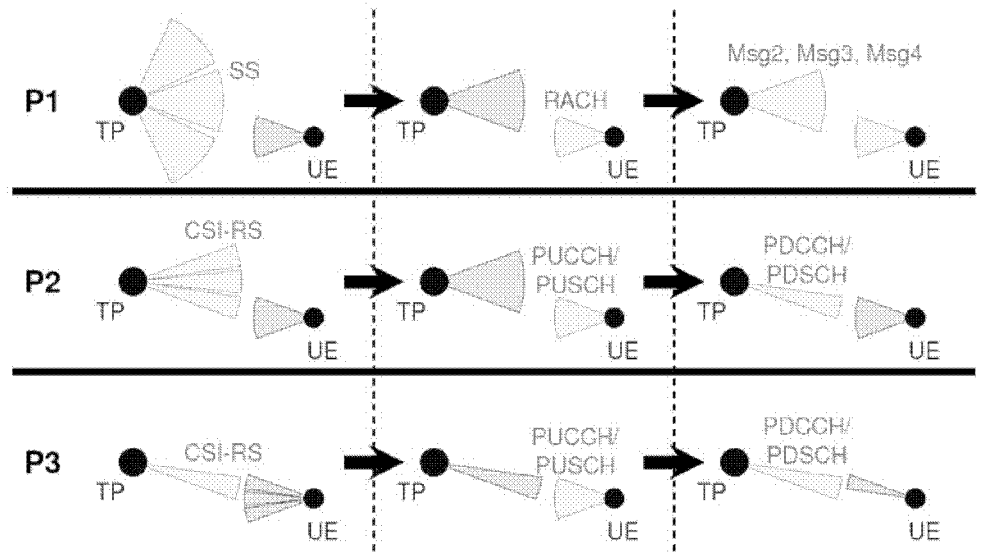
FIG. 3 is a diagram illustrating beam management procedures.

FIG. 3 is a diagram illustrating beam management procedures. As shown, the beam management procedures in 5th generation (5G) technology may comprise the following phases. At the first phase (P1), initial beam selection is performed, where a wide transmission reception point (TRP) transmission (Tx) beam is initially selected. At the second phase (P2), TRP Tx beam refinement is performed, where the gNB determines its Tx beam according to the UE's report. At the third phase (P3), UE reception (Rx) beam refinement is performed, where the UE Rx beam is determined when the TRP Tx beam is selected. In the above beam management procedures, the gNB must configure channel state information reference signal (CSI-RS) for the UE to measure available beams. The UE shall then report a list of beam candidates and their corresponding quality values, e.g.

reference signal receiving powers (RSRPs). On reception of this report, the gNB selects one as the downlink (DL) Tx beam for this UE. Afterwards, the UE Rx beam is selected towards the DL Tx beam selected. More details can be available in 3rd generation partnership project (3GPP) technical specification (TS) 38.214 V15.1.0.

In long term evolution (LTE), sounding reference signal (SRS) is usually used to measure the channel and get geographically information about UEs. However, SRS resource is limited. Base stations cannot get in-time measurements of all UEs with SRS.

Due to the beam management introduced in new radio (NR), it is possible to obtain merits to investigate UEs' spatial (or geographical) distribution. The present disclosure proposes a solution for dynamic RET control. The basic idea of the solution is to classify UEs based on the UEs' spatial distribution. Based on the classification, a new merit may be derived to direct the RET control. Hereinafter, the solution will be described in detail with reference to FIGS. 4-20.

Figure 4:
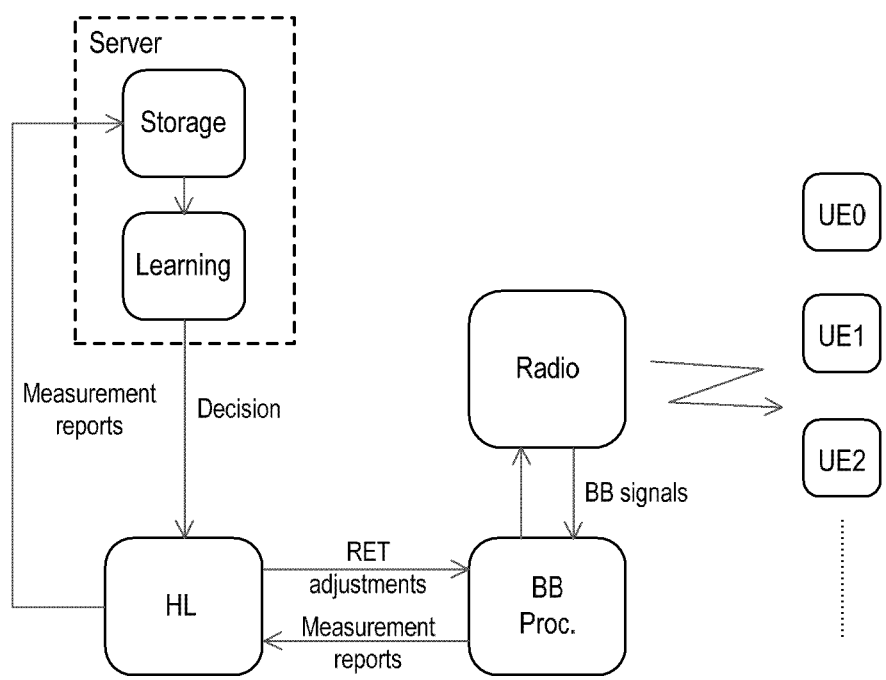
FIG. 4 is a diagram illustrating an exemplary communication system into which an embodiment of the disclosure is applicable.

FIG. 4 is a diagram illustrating an exemplary communication system into which an embodiment of the disclosure is applicable. The communication system may comprise a plurality of UEs, an access network node such as a base station, and a server. The base station may comprise a radio unit, a baseband processor and a high layer (HL). The HL refers to open system interconnection (OSI) layers above layer 2. The server may be a general server or may be implemented by cloud technology. As an exemplary example, the server may be a centralized unit (CU) as defined in cloud radio access network (C-RAN) architecture. As shown, the base station may send the required data (e.g. measurement reports) to the server to store the data and run machine learning to make decision for RET control. The decided RET adjustments may be sent back to the base station and applied under the control of the HL. It is also possible that the server is omitted and the base station runs machine learning to make decision for RET control.

The term UE may be used interchangeably with the term terminal device in this disclosure. The UE can communicate through a radio access communication link with the base station. The base station can provide radio access communication links to UEs that are within its communication service cell. Note that the communications may be performed between the UE and the base station according to any suitable communication standards and protocols. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 5:
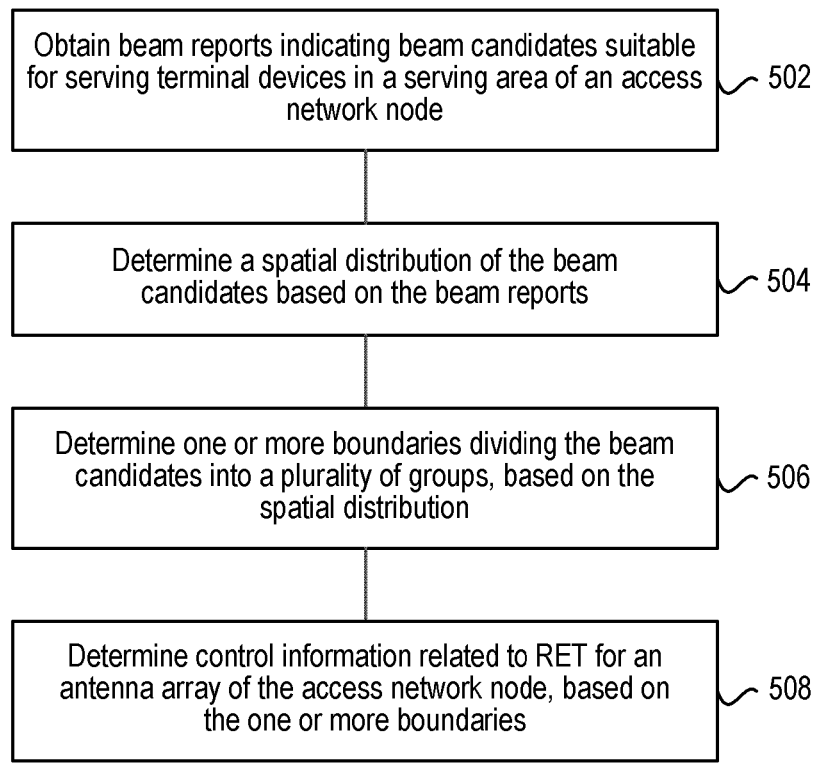
FIG. 5 is a flowchart illustrating a method implemented at a network entity according to an embodiment of the disclosure.
Figure 6:
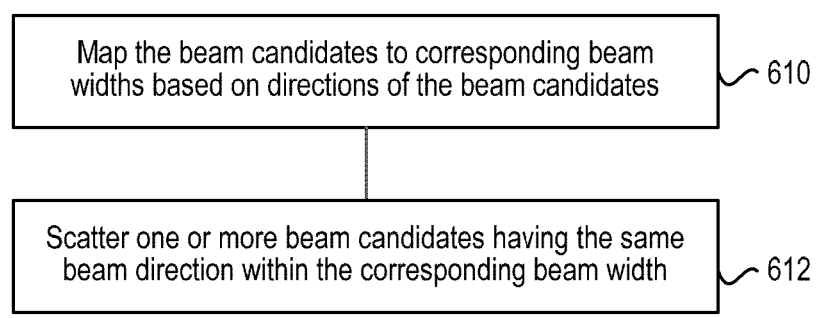
FIG. 6 is a flowchart for explaining the method of FIG. 5.

FIG. 5 is a flowchart illustrating a method implemented at a network entity according to an embodiment of the disclosure. The network entity may be an access network node or a server described above. At block 502, the network entity obtains beam reports indicating beam candidates suitable for serving terminal devices in a serving area of an access network node. For example, the beam reports may be beam management reports described above. The beam candidate may be indicated by its beam index. In the case where the network entity is an access network node, block 502 may be performed by receiving the beam reports from the terminal devices. In the case where the network entity is a server, block 502 may be performed by receiving the beam reports from an access network node serving the terminal devices.

At block 504, the network entity determines a spatial distribution of the beam candidates based on the beam reports. Since the beam candidates strongly correlate to the locations of the terminal devices, such spatial distribution may also be considered as the spatial distribution of the terminal devices. For example, block 504 may be implemented as blocks 610-612 of FIG. 6. At block 610, the network entity maps the beam candidates to corresponding beam widths based on directions of the beam candidates. In the case where the network entity is an access network node, for a certain reported beam candidate, the mapping can be done since the access network node knows the direction and beam width of the beam candidate. In the case where the network entity is a server, information about the directions and beam widths of the beam candidates may be shared with the server to perform the mapping.

Figure 7:
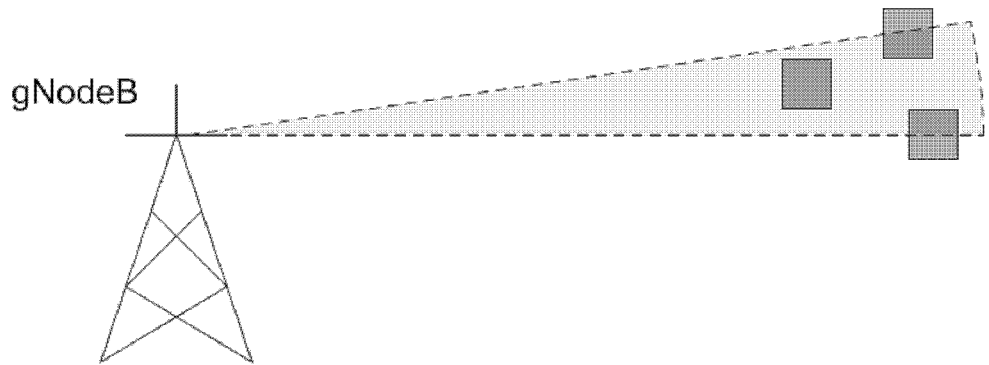
FIG. 7 is a diagram illustrating a scenario where the same beam candidate is reported by terminal devices at different locations.

At block 612, the network entity scatters one or more beam candidates having the same beam direction within the corresponding beam width. This may be based on the following considerations. On one hand, the beam width depends on the carrier frequency and radio antennas and even the same beam is preferred by two terminal devices, they may be at different locations within this beam as shown in FIG. 7. On the other hand, two adjacent beams may overlap with each other. For example, the one or more beam candidates having the same beam direction may be scattered within the corresponding beam width in a random, or uniform, or Gaussian manner, or any other suitable manner.

Figure 8:
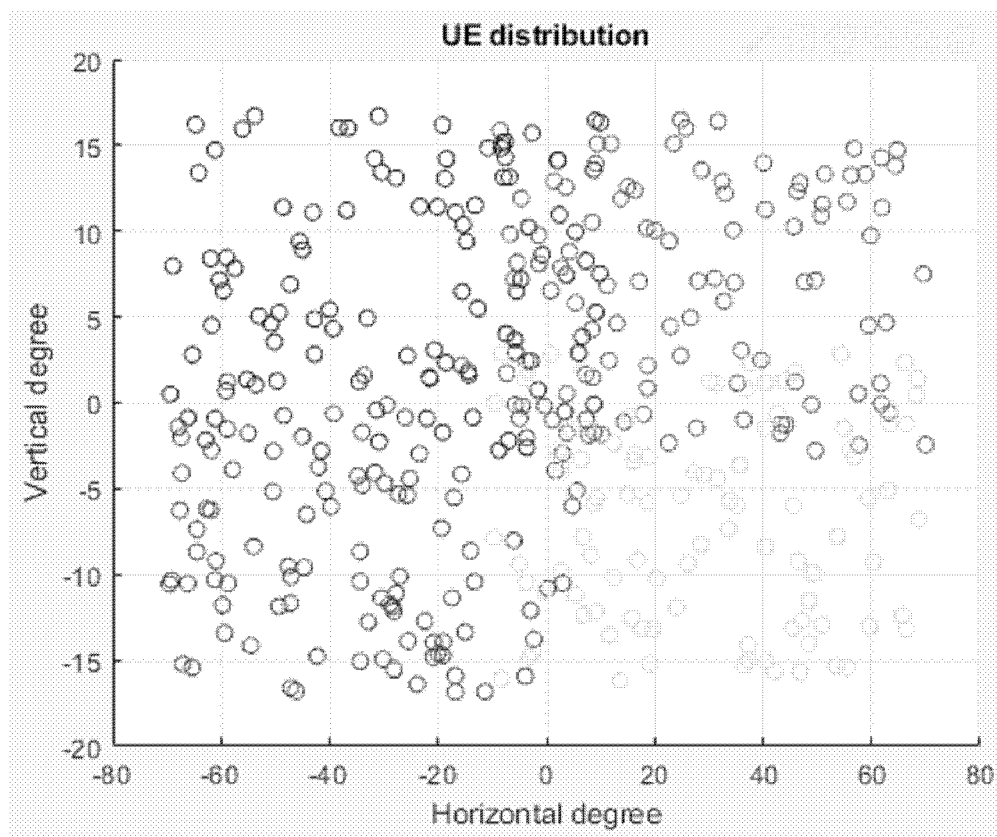
FIG. 8 is a diagram illustrating a spatial distribution of beam candidates.

As an exemplary example, FIG. 8 illustrates a spatial distribution of beam candidates. In this example, a random model is employed to scatter the UEs preferring the same beam. The scattered area is limited to the beam width. The following assumptions are employed: 1) the radio covers [−60, 60] degree over horizontal and [−15, 15] degree over vertical; 2) the center of the planar facing towards the radio antenna is at (0, 0); 3) each point refers to the UE direction randomly scattered by a random function $\phi(i)$, where this UE prefers beam index i.

Referring back to FIG. 5, at block 506, the network entity determines one or more boundaries dividing the beam candidates into a plurality of groups, based on the spatial distribution. As an option, block 506 may be implemented by using a supervised learning process. In this case, block 506 may be implemented as second sub-blocks. At the first sub-block, the beam candidates may be divided into multiple groups according to beam indexes of the beam candidates. These multiple groups may be used as training sets. As an exemplary example, for the spatial distribution shown in FIG. 8, all the samples (the scattered points accumulated) may be divided into 4 groups. The samples in the first quadrant (the upper right quadrant) may belong to the first group. The samples in the second quadrant (the upper left quadrant) may belong to the second group. The samples in the third quadrant (the lower left quadrant) may belong to the third group. The samples in the fourth quadrant (the lower right quadrant) may belong to the fourth group.

Figure 9A:
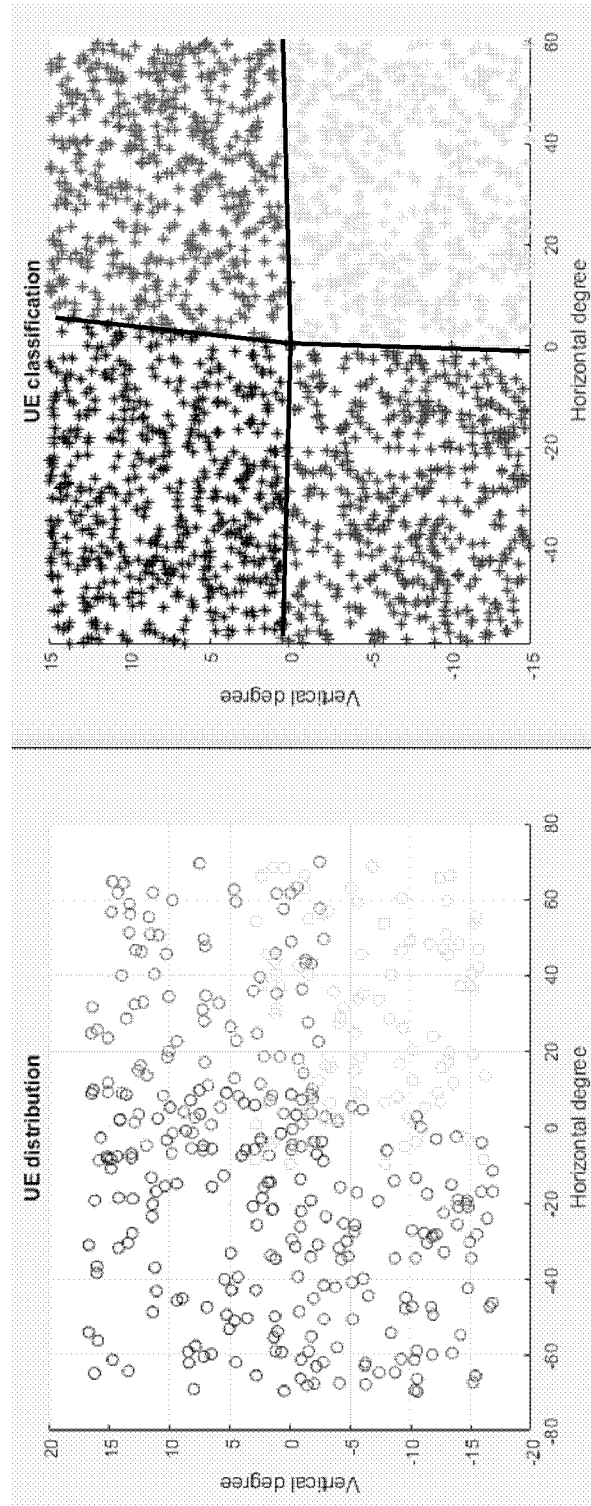
FIGS. 9A-9E show examples for explaining the method of FIG. 5.

At the second sub-block, the data sets may be used to train a classifier for determining the one or more boundaries based on the spatial distribution. When the classifier has been sufficiently trained, it may be directly applied to the subsequent spatial distribution to determine the one or more boundaries. As an exemplary example, a linear classifier may be used to classify the multiple groups. In this case, the boundary between each pair of groups is a linear function. For ease of understanding, FIGS. 9A-9E show some examples for the second sub-block. In FIG. 9A, the left diagram shows the training data sets in which the ratio between the numbers of samples in the first, second, third and fourth groups (in this order) equals to 100:100:100:100. The right diagram is the outcome of training. As shown, the linear classifier divides the planar of radio coverage into 4 areas with respect to the vertical and horizontal degree of each point. The joint point between the 4 boundaries is located at (0, 0) since UEs are equally distributed in the training sets shown in the left diagram.

Figure 9B:
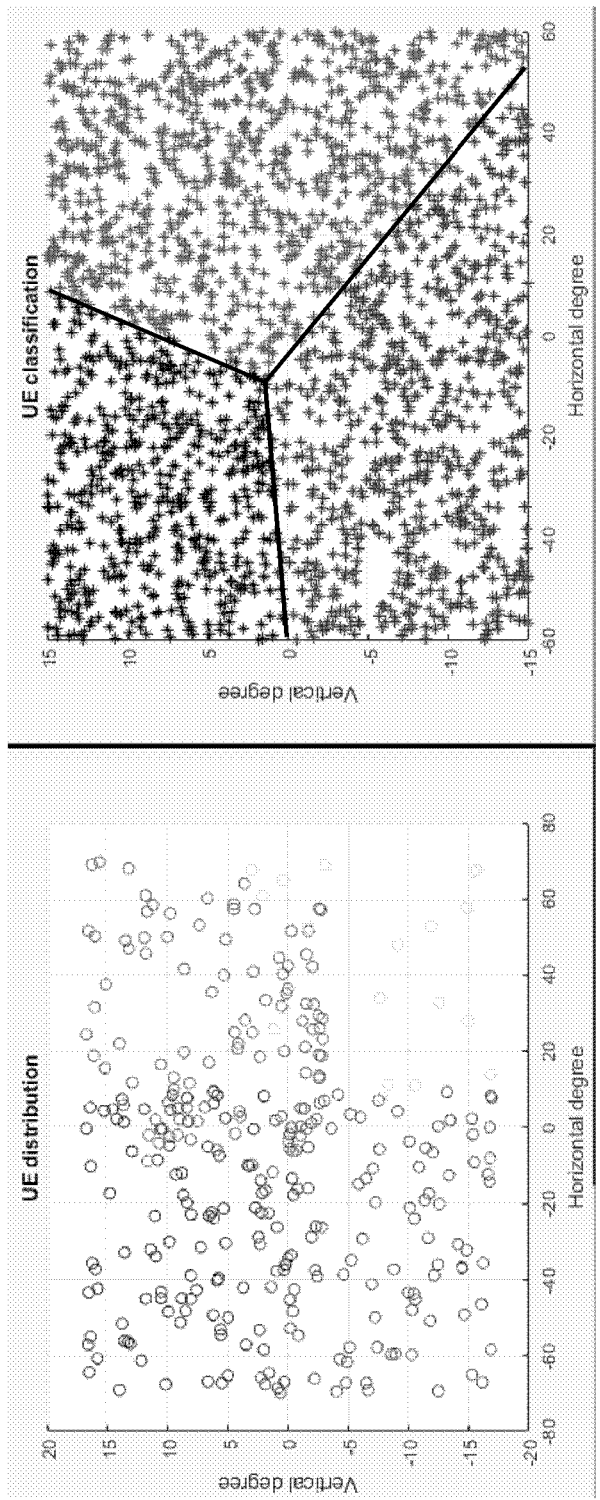

In FIG. 9B, the left diagram shows the training data sets in which the ratio between the numbers of samples in the 4 groups is 100:100:100:20. In the right diagram which is the outcome of training, the joint point moves to the up-left corner. The boundaries only divide the UEs into 3 groups since in linear classification, the group with samples much fewer than the others would be covered by the ones with much more samples. This means the plurality of groups divided by the boundaries may be different from the multiple groups divided at the first sub-block. In addition, it can be seen that the joint point may be influenced by the number of samples in each training set.

Figure 9C:
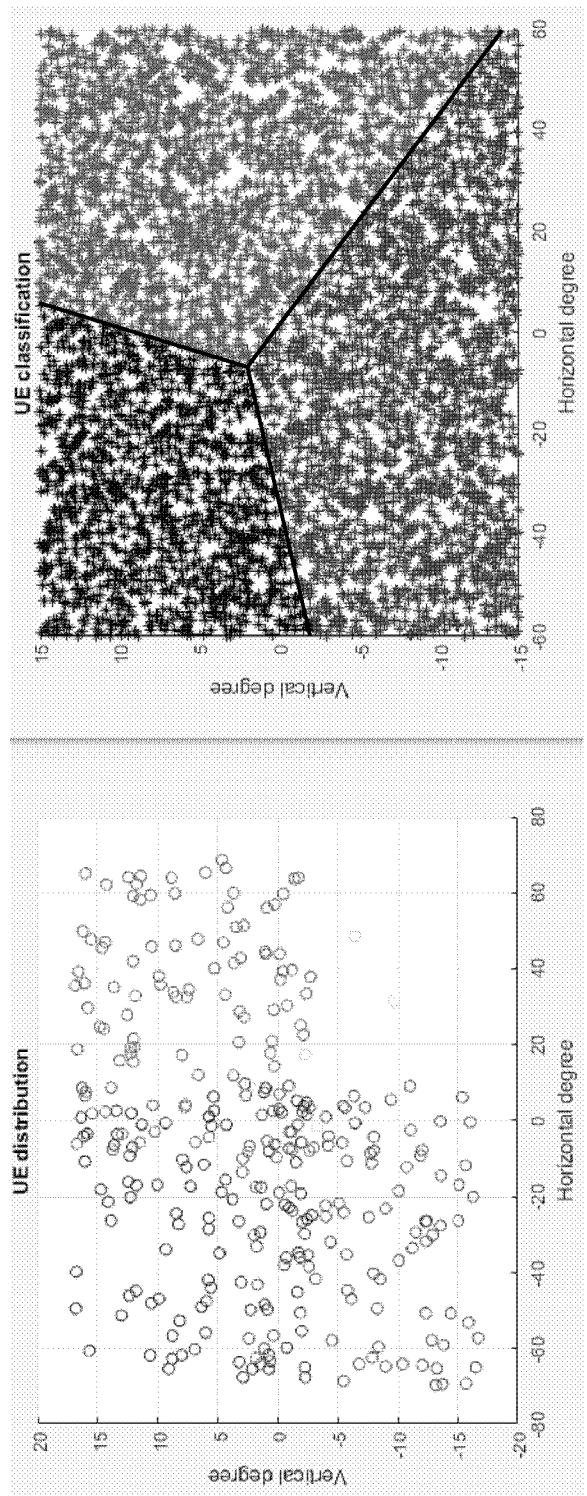
Figure 9D:
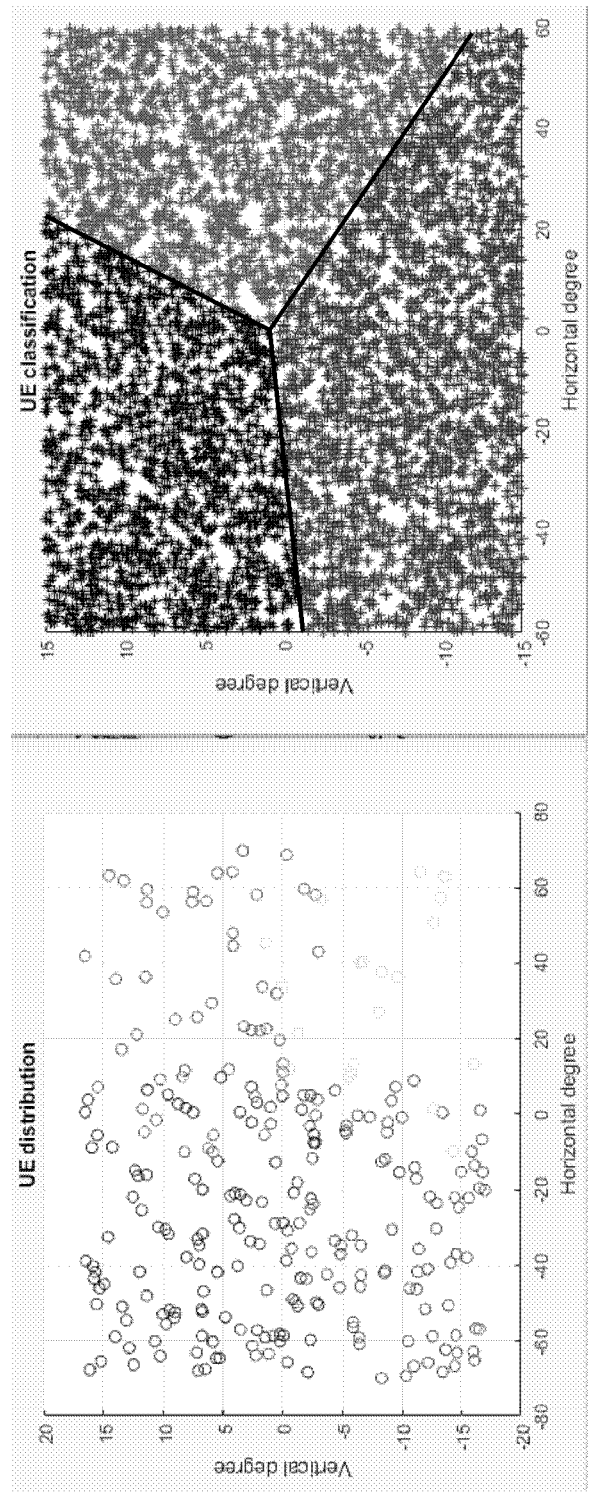
Figure 9E:
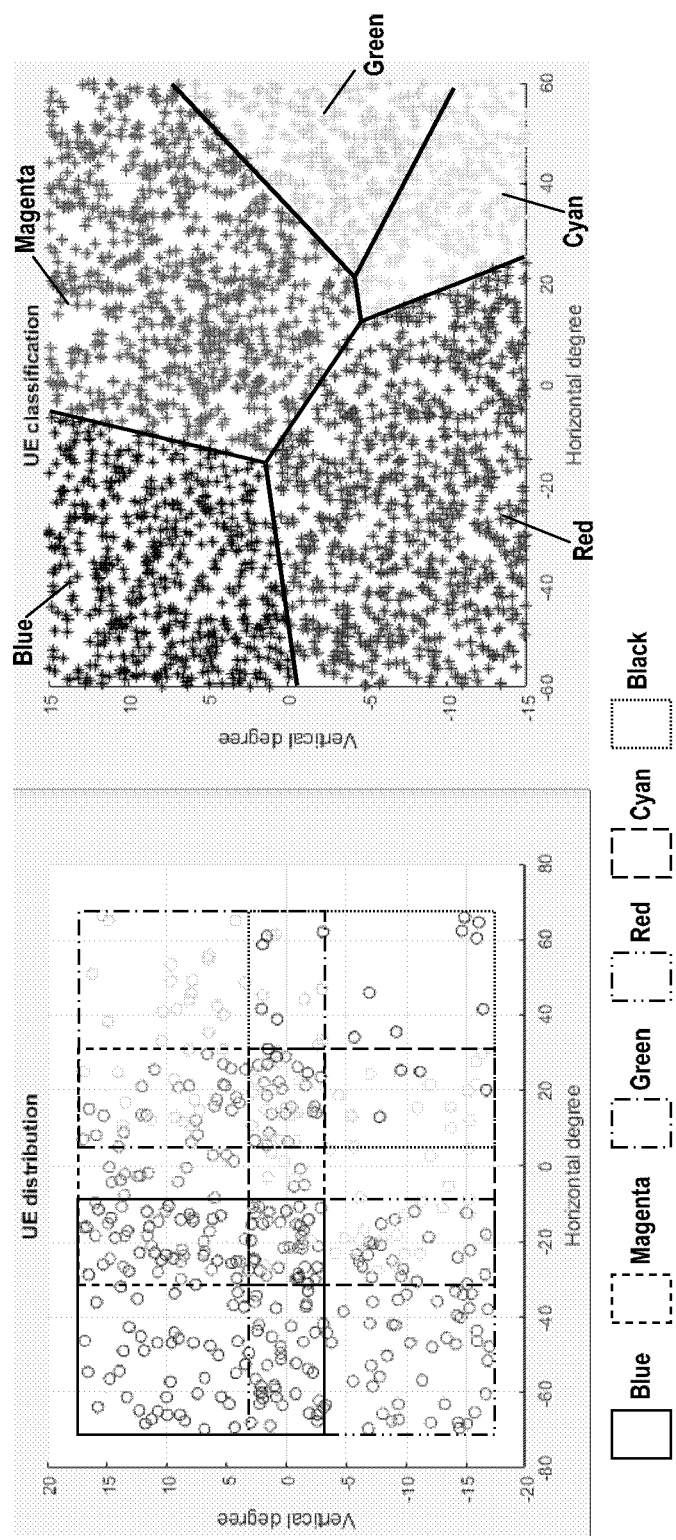
Figure 10A:
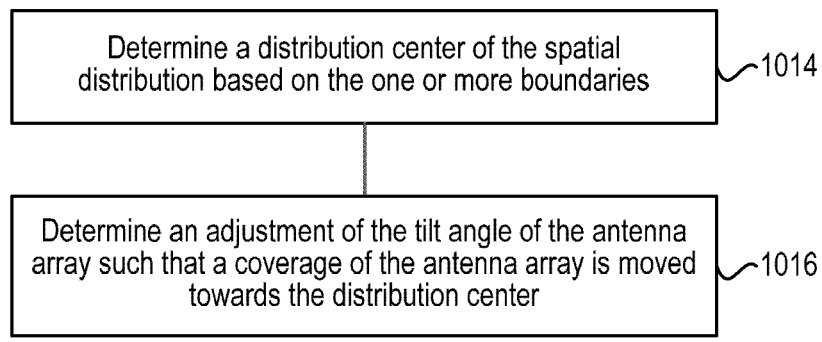
FIGS. 10A-10B are flowcharts for explaining the method of FIG. 5.
Figure 10B:
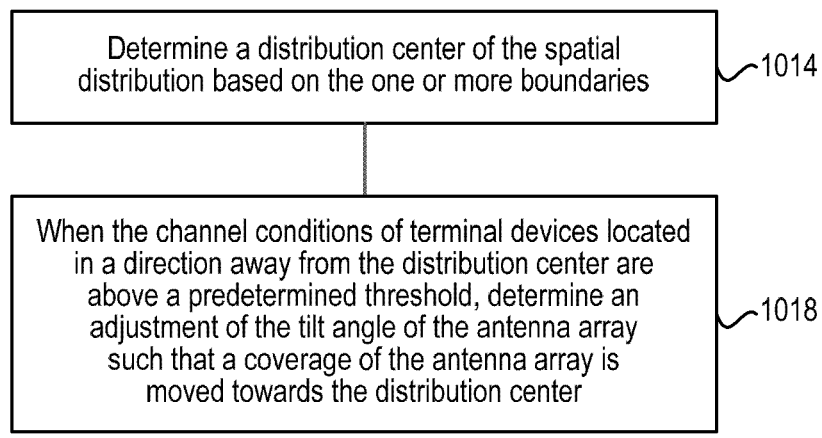

In FIG. 9C, the left diagram shows the training data sets in which the ratio between the numbers of samples in the 4 groups is 100:100:100:5. Since the number of samples in the fourth group reduces to 5, the joint point moves towards up-left corner further in the right diagram. In FIG. 9D, the left diagram shows the training data sets in which the ratio between the numbers of samples in the 4 groups is 100:100:50:20. Since the number of samples in the third group is reduced causing the new distribution over horizontal to be closer to an even distribution, the joint point further moves towards right back in the right diagram. The joint point in the above examples may be determined as the center point of the spatial distribution. To avoid further issues such as overfitting due to linear classification being sensitive to outliers, the new center point may be a function of the prior joint point. For example, a maximum adjustable range may be set to avoid overfitting issues.

When there are many samples only at not more than 2 sets, it may be not easy to obtain the joint point. To avoid this issue, more groups may be employed or some exceptional adjustment may be defined for such particular cases. If more groups are defined, multiple joint points may be obtained. For example, In FIG. 9E, the left diagram shows the training data sets in which the samples are divided into 6 groups marked as Blue, Magenta, Green, Red, Cyan and Black. Each group of samples are distributed in a corresponding rectangle. The ratio between the numbers of samples in Blue group, Magenta group, Green group, Red group, Cyan group and Black group is 100:100:50:100:50:20. In the right diagram, there exist 3 joint points. In this case, a point having the same distance to these 3 joint points may be determined as the center point, or different weights may be applied to these 3 joint points to determine the center point.

In the above examples, the horizontal and vertical degrees are employed to perform linear classification. Although the distance (in the case of line-of-sight propagation) or the route (in the case of non-line-of-sight propagation) between UEs and the base station is not considered in the above examples, it may be additionally considered in another example.

Optionally, the beam reports obtained at block 502 may further indicate channel conditions over the beam candidates and the one or more boundaries may be determined based further on the channel conditions. In this case, at the first sub-block described above, the beam candidates may be divided into multiple groups according to the beam indexes and channel conditions (e.g. signal qualities) over the beam candidates. These multiple groups may be used as training sets. Then, the second sub-block may be performed similarly. The signal qualities may be represented by any suitable merit, such as RSRP, signal to interference plus noise ratio (SINR), etc.

As another option, block 506 may be implemented by using an unsupervised learning process. Optionally, the beam reports may further indicate channel conditions over the beam candidates and the one or more boundaries may be determined based further on the channel conditions. For example, a clustering process (e.g. K-means clustering) may be used to divide the beam candidates into a plurality of clusters having similar locations (and optionally similar channel conditions) thereby obtaining the one or more boundaries between the clusters. It should be noted that the present disclosure is not limited to the above examples and any other suitable machine learning process (e.g. unlinear classification, neural networks, or the like) may be used instead or in combination.

Referring back to FIG. 5, at block 508, the network entity determines control information related to RET for an antenna array of the access network node, based on the one or more boundaries. In this way, RET control can be effectively directed with the beam reports. As an option, block 508 may be implemented as blocks 1014 and 1016 of FIG. 10A. At block 1014, the network entity determines a distribution center of the spatial distribution based on the one or more boundaries. As described above, if there is one joint point between the boundaries, the joint point may be determined as the distribution center. If there are multiple joint points between the boundaries, a point having the same distance to the multiple joint points may be determined as the distribution center, or different weights may be applied to the multiple joint points to determine the distribution center. At block 1016, the network entity determines an adjustment of the tilt angle of the antenna array such that a coverage of the antenna array is moved towards the distribution center. In this way, cell throughput and cell coverage can be enhanced. For example, in the scenario shown in FIG. 9B, since the distribution center moves to the up-left corner relative to the antenna array, the network entity may determine to tilt up the antenna array.

As another option, the beam reports further indicate channel conditions over the beam candidates and the control information related to RET may be determined based further on the channel conditions. In this case, block 508 may be implemented as blocks 1014 and 1018 of FIG. 10B. At block 1014, the network entity determines a distribution center of the spatial distribution based on the one or more boundaries. At block 1018, when the channel conditions of terminal devices located in a direction away from the distribution center are above a predetermined threshold, the network entity determines an adjustment of the tilt angle of the antenna array such that a coverage of the antenna array is moved towards the distribution center. In other words, the beam quality may be considered as a penalty for RET adjustment. For example, there are many UEs in one direction, while they are very close to the base station according to their beam qualities. Then, it is not necessary to move the antenna towards them. On the other hand, although there are fewer UEs in one direction while they are far from the base station, it would be better to adjust the antenna towards them.

Optionally, the control information related to RET may be determined under a precondition that random access is ensured for the terminal devices in the serving area of the access network node. The random access can be given a higher weight since it is quite crucial for cellular communications. For example, the random access may be considered by the beams employed by physical random access channel (PRACH) message 1 of random access.

In the case where the network entity is an access network node, the control information related to RET may be used by the access network node to control the antenna array. In the case where the network entity is a server, the control information related to RET may be sent to the access network node to control the antenna array.

Figure 11:
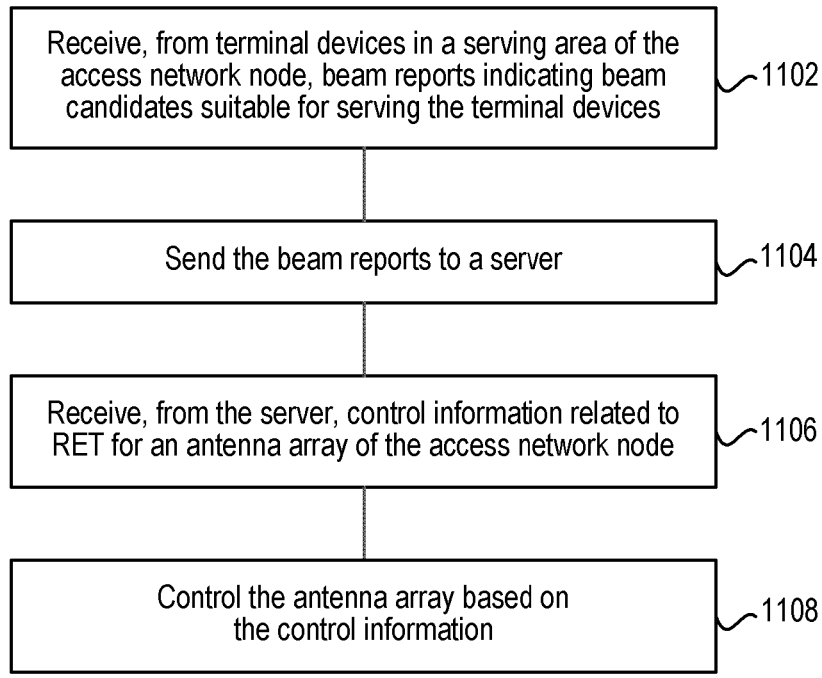
FIG. 11 is a flowchart illustrating a method implemented at an access network node according to an embodiment of the disclosure.

FIG. 11 is a flowchart illustrating a method implemented at an access network node according to an embodiment of the disclosure. At block 1102, the access network node receives, from terminal devices in a serving area of the access network node, beam reports indicating beam candidates suitable for serving the terminal devices. At block 1104, the access network node sends the beam reports to a server. Block 1102 or 1104 corresponds to block 502. At block 1106, the access network node receives, from the server, control information related to RET for an antenna array of the access network node. The control information may be determined by the server as described hereinbefore. At block 1108, the access network node controls the antenna array based on the control information. In this way, RET control can be effectively directed with the beam reports.

Figure 12:
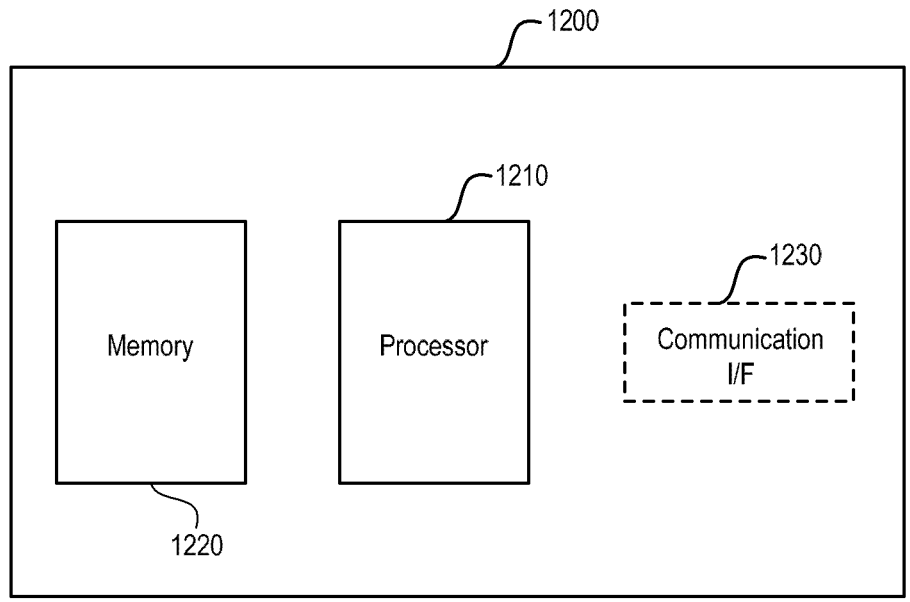
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the network entity and the access network node described above may be implemented through the apparatus 1200. As shown, the apparatus 1200 may include a processor 1210, a memory 1220 that stores a program, and optionally a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
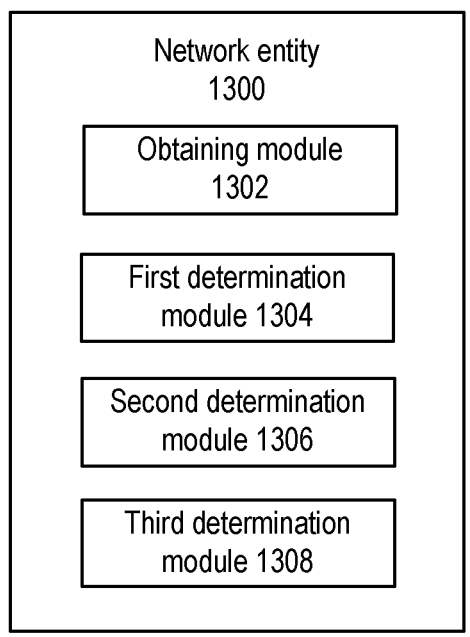
FIG. 13 is a block diagram showing a network entity according to an embodiment of the disclosure.

FIG. 13 is a block diagram showing a network entity according to an embodiment of the disclosure. As shown, the network entity 1300 comprises an obtaining module 1302, a first determination module 1304, a second determination module 1306 and a third determination module 1308. The obtaining module 1302 may be configured to obtain beam reports indicating beam candidates suitable for serving terminal devices in a serving area of an access network node, as described above with respect to block 502. The first determination module 1304 may be configured to determine a spatial distribution of the beam candidates based on the beam reports, as described above with respect to block 504. The second determination module 1306 may be configured to determine one or more boundaries dividing the beam candidates into a plurality of groups, based on the spatial distribution, as described above with respect to block 506. The third determination module 1308 may be configured to determine control information related to RET for an antenna array of the access network node, based on the one or more boundaries, as described above with respect to block 508.

Figure 14:
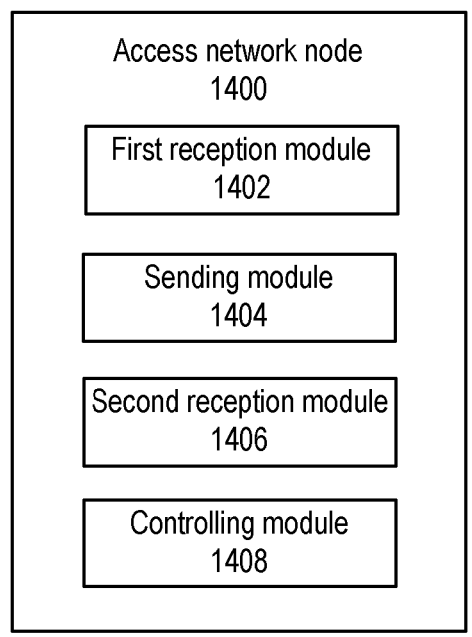
FIG. 14 is a block diagram showing an access network node according to an embodiment of the disclosure.

FIG. 14 is a block diagram showing an access network node according to an embodiment of the disclosure. As shown, the access network node 1400 comprises a first reception module 1402, a sending module 1404, a second reception module 1406 and a controlling module 1408. The first reception module 1402 may be configured to receive, from terminal devices in a serving area of the access network node, beam reports indicating beam candidates suitable for serving the terminal devices, as described above with respect to block 1102. The sending module 1404 may be configured to send the beam reports to a server, as described above with respect to block 1104. The second reception module 1406 may be configured to receive, from the server, control information related to RET for an antenna array of the access network node, as described above with respect to block 1106. The controlling module 1408 may be configured to control the antenna array based on the control information, as described above with respect to block 1108. The modules described above may be implemented by hardware, or software, or a combination of both.

Figure 15:
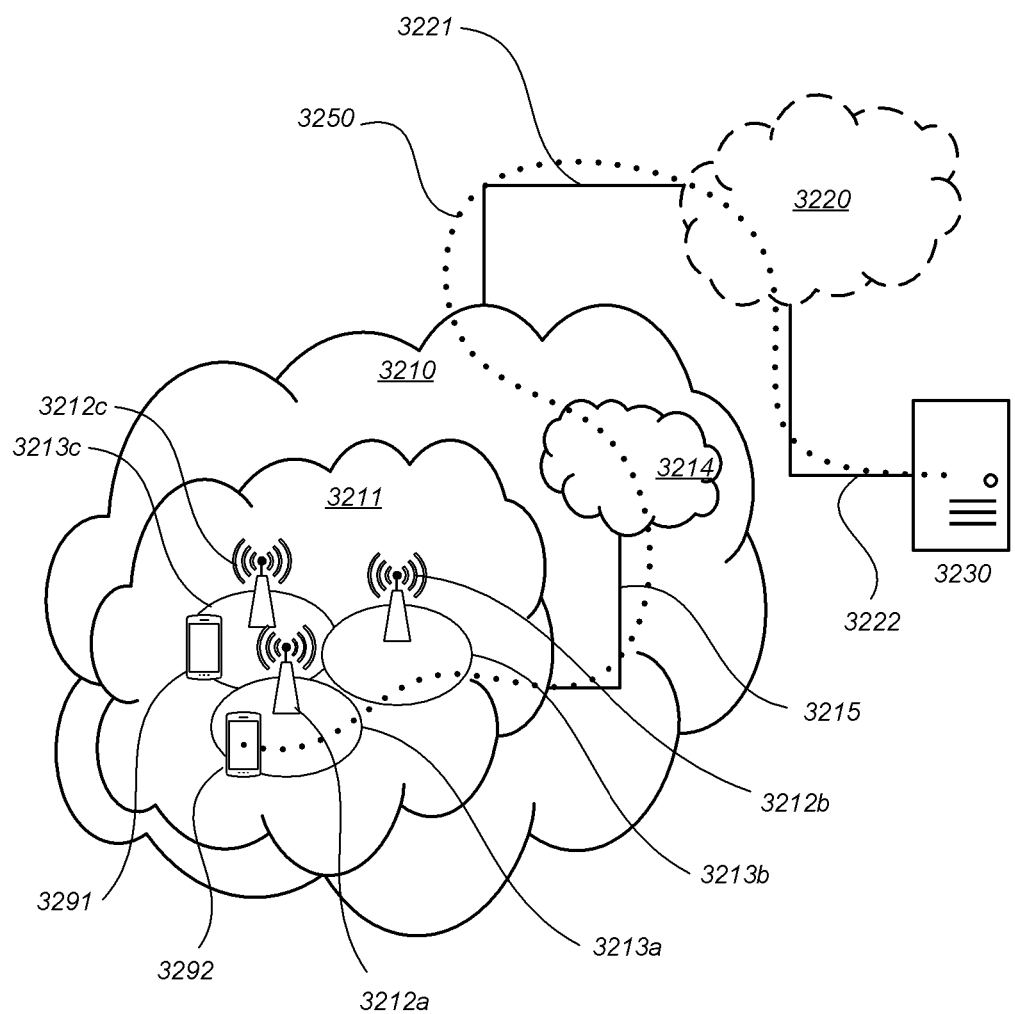
FIG. 15 is a diagram showing a telecommunication network connected via an intermediate network to a host computer in accordance with some embodiments.

With reference to FIG. 15, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 15 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 16) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 16:
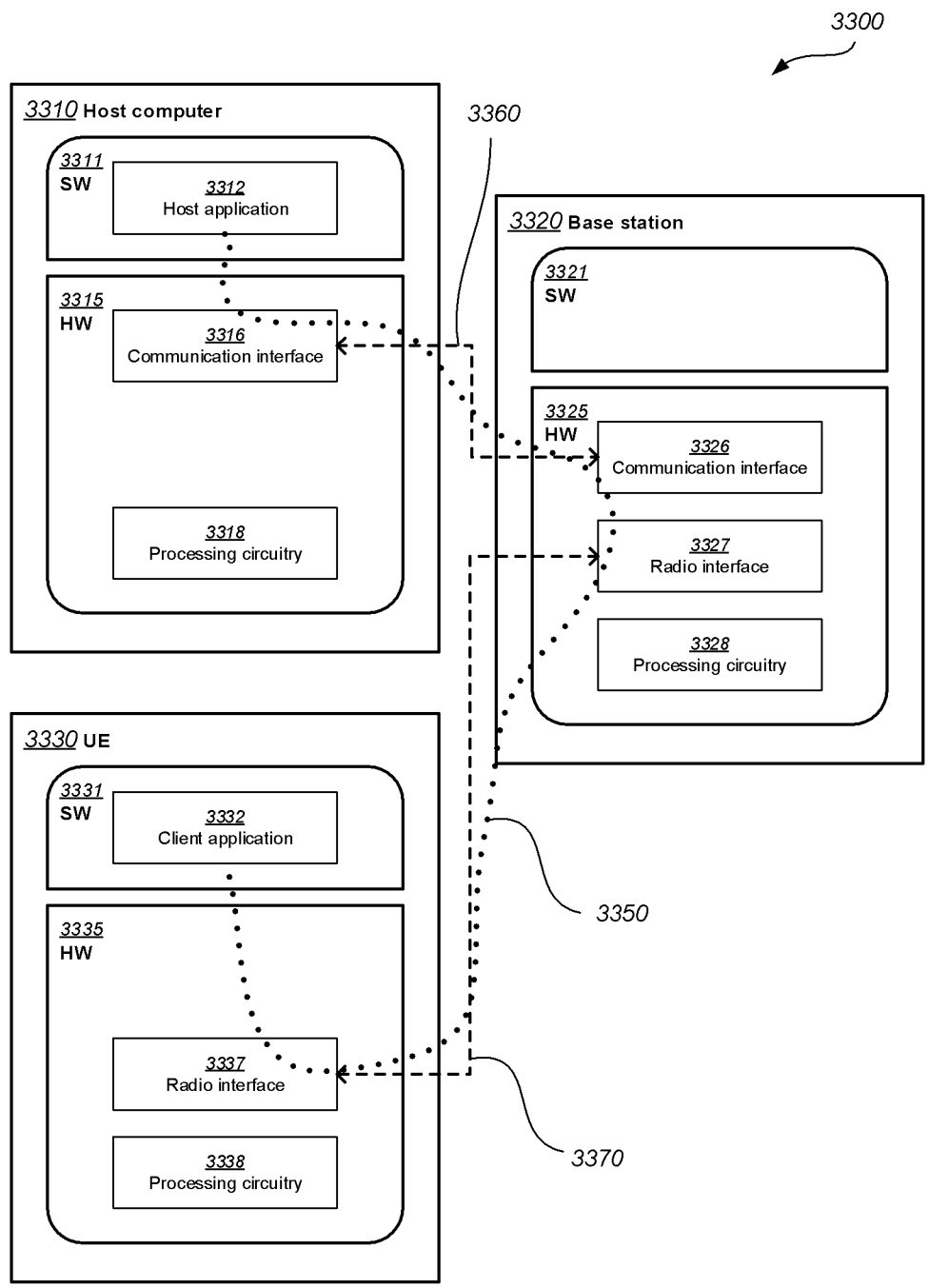
FIG. 16 is a diagram showing a host computer communicating via a base station with a user equipment in accordance with some embodiments.

It is noted that host computer 3310, base station 3320 and UE 3330 illustrated in FIG. 16 may be similar or identical to host computer 3230, one of base stations 3212a, 3212b, 3212c and one of UEs 3291, 3292 of FIG. 15, respectively. This is to say, the inner workings of these entities may be as shown in FIG. 16 and independently, the surrounding network topology may be that of FIG. 15.

In FIG. 16, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the throughput and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 17:
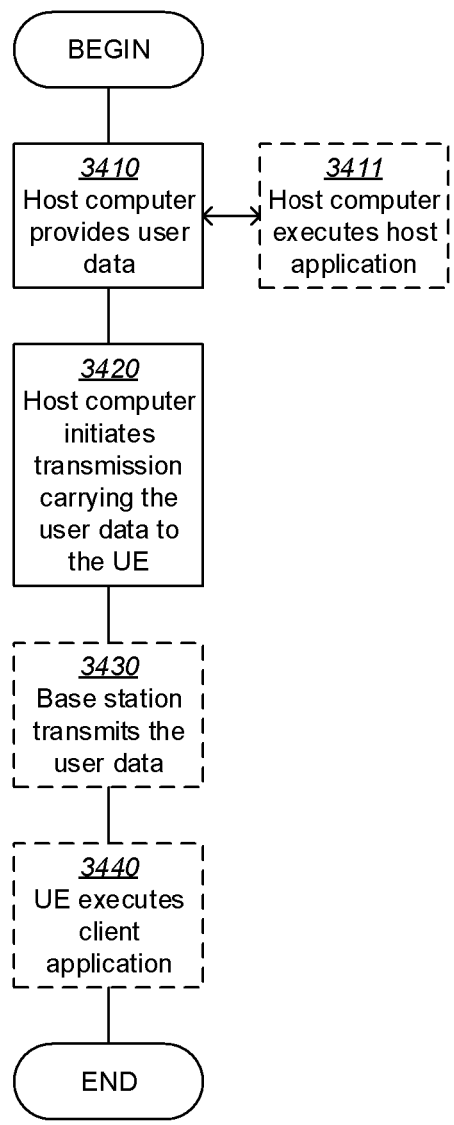
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 18:
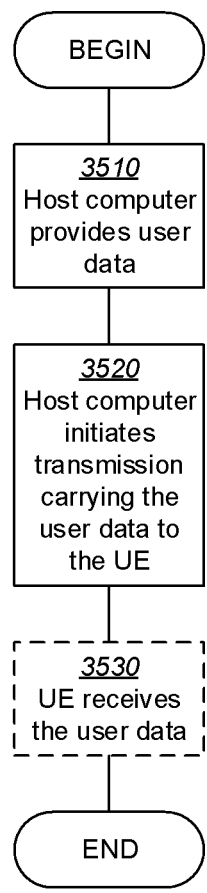
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 19:
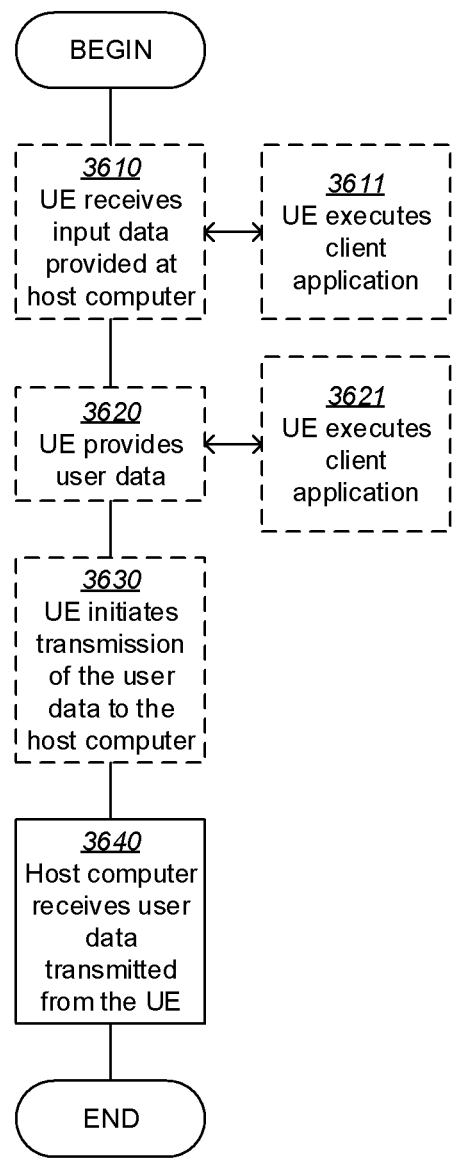
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 20:
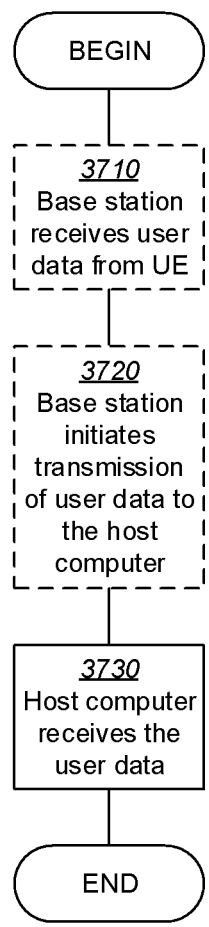
FIG. 20 is a flowchart illustrating a method implemented in a communication system in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may obtain beam reports indicating beam candidates suitable for serving terminal devices in a serving area of an access network node. The base station may determine a spatial distribution of the beam candidates based on the beam reports. The base station may determine one or more boundaries dividing the beam candidates into a plurality of groups, based on the spatial distribution. The base station may determine control information related to RET for an antenna array of the access network node, based on the one or more boundaries.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to obtain beam reports indicating beam candidates suitable for serving terminal devices in a serving area of an access network node. The base station's processing circuitry may be further configured to determine a spatial distribution of the beam candidates based on the beam reports. The base station's processing circuitry may be further configured to determine one or more boundaries dividing the beam candidates into a plurality of groups, based on the spatial distribution. The base station's processing circuitry may be further configured to determine control information related to RET for an antenna array of the access network node, based on the one or more boundaries.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may receive, from terminal devices in a serving area of the access network node, beam reports indicating beam candidates suitable for serving the terminal devices. The base station may send the beam reports to a server. The base station may receive, from the server, control information related to RET for an antenna array of the access network node. The base station may control the antenna array based on the control information.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to receive, from terminal devices in a serving area of the access network node, beam reports indicating beam candidates suitable for serving the terminal devices. The base station's processing circuitry may be further configured to send the beam reports to a server. The base station's processing circuitry may be further configured to receive, from the server, control information related to RET for an antenna array of the access network node. The base station's processing circuitry may be further configured to control the antenna array based on the control information.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a network entity, comprising:
   obtaining beam reports indicating beam candidates suitable for serving terminal devices in a serving area of an access network node;
   determining a spatial distribution of the beam candidates based on the beam reports;
   determining one or more boundaries dividing the beam candidates into a plurality of groups, based on the spatial distribution; and
   determining control information related to remote electrical tilt, RET, for an antenna array of the access network node, based on the one or more boundaries.

2. The method according to claim 1, wherein the beam reports further indicate channel conditions over the beam candidates; and
   wherein the one or more boundaries are determined based further on the channel conditions.

3. The method according to claim 1, wherein the beam reports further indicate channel conditions over the beam candidates; and
   wherein the control information related to RET is determined based further on the channel conditions.

4. The method according to claim 1, wherein the control information related to RET is determined under a precondition that random access is ensured for the terminal devices in the serving area of the access network node.

5. The method according to claim 1, wherein determining the spatial distribution of the beam candidates comprises:
   mapping the beam candidates to corresponding beam widths based on directions of the beam candidates; and
   scattering one or more beam candidates having the same beam direction within the corresponding beam width.

6. The method according to claim 5, wherein the one or more beam candidates having the same beam direction are scattered within the corresponding beam width in a random, or uniform, or Gaussian manner.

7. The method according to claim 1, wherein the one or more boundaries are determined by using a machine learning process.

8. The method according to claim 7, wherein the machine learning process is a supervised learning process or an unsupervised learning process.

9. The method according to claim 8, wherein the supervised learning process is performed by using at least one of:
   linear classification;
   unlinear classification; and
   neural networks.

10. The method according to claim 8, wherein the unsupervised learning process comprises a clustering process.

11. The method according to claim 1, wherein determining the control information related to RET comprises:
    determining a distribution center of the spatial distribution based on the one or more boundaries; and
    determining an adjustment of the tilt angle of the antenna array such that a coverage of the antenna array is moved towards the distribution center.

12. The method according to claim 3, wherein determining the control information related to RET comprises:
    determining a distribution center of the spatial distribution based on the one or more boundaries; and
    when the channel conditions of terminal devices located in a direction away from the distribution center are above a predetermined threshold, determining an adjustment of the tilt angle of the antenna array such that a coverage of the antenna array is moved towards the distribution center.

13. The method according to claim 1, wherein the network entity is the access network node; and
    wherein the control information related to RET is used by the access network node to control the antenna array.

14. The method according to claim 1, wherein the network entity is a server; and
    wherein the control information related to RET is sent to the access network node to control the antenna array.

15. A method performed by an access network node, comprising:
    receiving, from terminal devices in a serving area of the access network node, beam reports indicating beam candidates suitable for serving the terminal devices;
    sending the beam reports to a server;
    receiving, from the server, control information related to remote electrical tilt, RET, for an antenna array of the access network node; and
    controlling the antenna array based on the control information.

16. A network entity comprising:
    at least one processor; and
    at least one memory, the at least one memory containing instructions executable by the at least one processor, whereby the network entity is operative to:
        obtain beam reports indicating beam candidates suitable for serving terminal devices in a serving area of an access network node;
        determine a spatial distribution of the beam candidates based on the beam reports;
        determine one or more boundaries dividing the beam candidates into a plurality of groups, based on the spatial distribution; and determine control information related to remote electrical tilt, RET, for an antenna array of the access network node, based on the one or more boundaries.

17. The network entity according to claim 16, wherein the beam reports further indicate channel conditions over the beam candidates; and
    wherein the instructions are executable by the at least one processor, whereby the network entity is operative to determine the one or more boundaries based further on the channel conditions.

18. The network entity according to claim 16, wherein the beam reports further indicate channel conditions over the beam candidates; and
    wherein the instructions are executable by the at least one processor, whereby the network entity is operative to determine the control information related to RET based further on the channel conditions.

19. The network entity according to claim 16, wherein the instructions are executable by the at least one processor, whereby the network entity is operative to determine the control information related to RET under a precondition that random access is ensured for the terminal devices in the serving area of the access network node.

20. The network entity according to claim 16, wherein the instructions are executable by the at least one processor, whereby the network entity is operative to determine the spatial distribution of the beam candidates by:
    mapping the beam candidates to corresponding beam widths based on directions of the beam candidates; and
    scattering one or more beam candidates having the same beam direction within the corresponding beam width,
    wherein a coverage of the antenna array is moved towards the distribution center.

* * * * *